United States Patent
Yiannios et al.

(10) Patent No.: US 11,044,923 B2
(45) Date of Patent: *Jun. 29, 2021

(54) GUMMIES CONTAINING FORMULATIONS WITH ENHANCED DELIVERY MATRIX, AND METHODS OF MAKING SAME

(71) Applicant: VITASOME LABS, INC., Gilbert, AZ (US)

(72) Inventors: James John Yiannios; Judith S. Reyes, Tempe, AZ (US)

(73) Assignee: Vitasome Labs, Inc., Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,706

(22) Filed: Aug. 31, 2020

(65) Prior Publication Data

US 2020/0397015 A1 Dec. 24, 2020

Related U.S. Application Data

(63) Continuation-in-part of application No. 16/522,021, filed on Jul. 25, 2019, now abandoned, which is a continuation of application No. PCT/US2018/015035, filed on Jan. 24, 2018, which is a continuation of application No. 15/475,636, filed on Mar. 31, 2017, now Pat. No. 10,299,493, which is a continuation of application No. 15/414,877, filed on Jan. 25, 2017, now Pat. No. 10,299,492, which is a continuation-in-part of application No. 14/132,486, filed on Dec. 18, 2013, now Pat. No. 9,585,417.

(60) Provisional application No. 61/837,414, filed on Jun. 20, 2013.

(51) Int. Cl.

| | |
|---|---|
| *A23G 3/36* | (2006.01) |
| *A23L 33/15* | (2016.01) |
| *A23G 1/42* | (2006.01) |
| *A23L 33/10* | (2016.08) |
| *A23G 3/48* | (2006.01) |
| *A23G 3/54* | (2006.01) |

(52) U.S. Cl.
CPC ............... *A23G 3/368* (2013.01); *A23G 1/42* (2013.01); *A23G 3/36* (2013.01); *A23G 3/364* (2013.01); *A23G 3/48* (2013.01); *A23G 3/54* (2013.01); *A23L 33/10* (2016.08); *A23L 33/15* (2016.08); *A23V 2002/00* (2013.01)

(58) Field of Classification Search
CPC . A23G 3/368; A23G 3/48; A23G 3/36; A23G 3/364; A23G 3/54; A23G 1/42; A23L 33/10; A23L 33/15; A23V 2002/00
See application file for complete search history.

(56) References Cited

U.S. PATENT DOCUMENTS

| | | |
|---|---|---|
| 5,120,561 A | 6/1992 | Silva et al. |
| 5,128,139 A | 7/1992 | Brown et al. |
| 5,891,465 A | 4/1999 | Keller et al. |
| 7,030,203 B2 | 4/2006 | Mosbey et al. |
| 7,300,670 B2 | 11/2007 | Venus et al. |
| 8,026,327 B2 | 9/2011 | Mosbey et al. |
| 8,147,869 B2 | 4/2012 | Guilford et al. |
| 8,282,977 B2 | 10/2012 | Bromley |
| 8,337,931 B2 | 12/2012 | Bromley |
| 2003/0109575 A1 | 6/2003 | Lambert et al. |
| 2005/0142124 A1 | 6/2005 | Kaiser |
| 2006/0099244 A1 | 5/2006 | Guilford |
| 2008/0145502 A1 | 6/2008 | Vincieri et al. |
| 2010/0029786 A1 | 2/2010 | Terada et al. |
| 2012/0149761 A1 | 6/2012 | Quay |
| 2012/0277316 A1 | 11/2012 | Tillman et al. |
| 2013/0287899 A1 | 10/2013 | Rifkin |

OTHER PUBLICATIONS

Glutasome. Glutasome (TM). 2012. [retreived on Oct. 9, 2014]. Retrieved from the Internet. <URL:http"www.glutasome.com/>entire document.
Zeolife. An Acute Toxicity Study of Glutasome by Oral Gavage in Rats. pp. 1-59, 2012. [retrieved on Oct. 9, 2014]. Retrieved from the Internet. <URL: http://zeolife.com/newsite/sites/default/files/Summary_Trials.pdf>. p. 43.
Search History: Limited Classification Search, dated Sep. 12, 2014, from corresponding International Patent Application PCT/US2014/043121.

*Primary Examiner* — Snigdha Maewall
(74) *Attorney, Agent, or Firm* — Carrie Blackman & Associates, P.C.; Fulchanf P. Shende; Joseph P. Carrier

(57) ABSTRACT

A gummy includes an inner portion, a formulation having a dispersion including a plurality of liposomal vesicles contained in the inner portion; and an outer portion which surrounds the inner portion. The formulation includes an active ingredient including cannabidiol (CBD), phospholipid contained in the liposomal vesicles, and a optionally added coating material, the CBD being incorporated within the liposomal vesicles. A method of making such gummy having the CBD formulation in the inner portion thereof includes setting up a central filling apparatus having a shell syrup hopper, a central filling hopper, and a manifold branch and nozzle mechanism; filling the shell syrup hopper with the base material; filling the central filling hopper with the CBD formulation; dispensing the base material and CBD formulation in the manifold branch and nozzle mechanism, and further into the gummy mold; and extracting the gummy from the gummy mold.

20 Claims, 3 Drawing Sheets

GUMMIES CONTAINING FORMULATIONS WITH ENHANCED DELIVERY MATRIX, AND METHODS OF MAKING SAME

CROSS-REFERENCE TO RELATED APPLICATIONS

This application is Continuation-in-part of U.S. application Ser. No. 16/522,021, filed on Jul. 25, 2019, which is a continuation application of International Application PCT/US2018/015035, filed on Jan. 24, 2018, which is a continuation of U.S. application Ser. No. 15/475,636, filed on Mar. 31, 2017, which is a continuation of U.S. application Ser. No. 15/414,877, filed on Jan. 25, 2017, which is a continuation-in-part of the U.S. application Ser. No. 14/132,486, filed on Dec. 18, 2013, which claims priority to U.S. Provisional patent application No. 61/837,414, filed on Jun. 20, 2013. The entire subject matter of these priority documents, including specification claims and drawings thereof, is incorporated by reference herein.

BACKGROUND OF THE INVENTION

1. Field of the Invention

The present invention relates to gummies containing formulations in which active ingredients, such as, cannabidiol (hereinafter referred to as Hemp CBD, hemp-derived CBD or as CBD) and/or tetrahydrocannabinol (THC), which are natural compounds found in plants of the *cannabis* genus, are incorporated in liposomal vesicles which may be physically coated and/or surrounded by a polymer, including biopolymers, for prolonging circulatory time of dietary supplemental compositions in bloodstream of humans and animals when ingested, and to methods of making the same. More particularly, the present invention relates to gummies containing the formulations in which the active ingredient is CBD which is incorporated in liposomal vesicles which may be coated and/or surrounded by one of polymer of ethylene oxide, e.g., polyethylene glycol, a biopolymer, e.g., fenusterol derived from fenugreek seeds, chitosan derived from marine life, such as shrimp, crabs, and a combination thereof; and to methods of making such gummies.

2. Background of the Invention

For decades, the absorption of formulations including nutrients/active ingredients—such as, vitamins, minerals, plant based compounds including CBD and/or THC—has somewhat remained controversial and a matter of considerable investigation. A nutrient, such as CBD, is a component used for surviving and growing of humans and animals. It is generally known that when dietary supplements, whether vitamins, minerals or CBD are ingested, only a fraction of the stated dose of active ingredient on the label of these products is actually absorbed. It appears that so much of the product may be lost when phagocytes begin attacking the digestive system. The phagocytes cells may perceive nutrients to be foreign invaders. In other words, a stated dose of the nutrient may have very little bioavailability.

Further, there are known nutrient gummies (vitamins, minerals and CBD) for adults. However, when gummies are ingested, nutrients included in the gummies are not designed to be present in the bloodstream for an extended period of time so as to increase bioavailability thereof. Accordingly, there is a need to make gummies containing a formulation including nutrients, such as CBD, which are sustained in bloodstreams for extended time periods thereby providing increased bioavailability of the nutrients such as vitamins and minerals.

The present invention has been made to overcome the drawbacks of the existing gummies containing formulations including CBD and methods of making the gummies containing such formulations. Accordingly, it is one of the objects of the present invention to provide gummies containing formulations including one or more active nutrients, such as CBD and/or THC, vitamins, minerals, antioxidants (e.g., reduced glutathione), with enhanced delivery matrix and having increased bioavailability, and methods of making the same.

SUMMARY OF THE INVENTION

In order to achieve the above objects, the present invention provides a gummy containing a formulation including CBD, and methods of making same. In this disclosure, the term CBD is used for cannabinoids/cannabidiol (hereinafter referred to as Hemp CBD, hemp-derived CBD or as CBD) and/or tetrahydrocannabinol (THC).

A gummy according one aspect of the present invention includes an inner portion; the formulation having a dispersion including a plurality of liposomal vesicles contained in the inner portion; and an outer portion which surrounds the inner portion. The formulation incorporated in the inner portion includes an active ingredient including CBD; phospholipid contained in the liposomal vesicles, CBD being incorporated within the liposomal vesicles; and a coating material including, for example, a combination of polyethylene glycol and chitosan. The coating material is free flowing in the dispersion such that the liposomal vesicles are surrounded by the coating material without being attached to the liposomal vesicles and without forming part of the liposomal vesicles and without affecting weight of the liposomal vesicles. The dispersion may be filtered using a tangential flow technique, which washes out outer periphery of the liposomal vesicles so as to remove inactive ingredients contained outside the liposomal vesicles without washing out the coating material surrounding the liposomal vesicles.

The active ingredients, in addition to CBD, may further include one or more of reduced glutathione (GSH), vitamin A, vitamin B1 (thiamine), vitamin B2 (riboflavin), vitamin B3 (niacin), vitamin B5 (pantothenic acid), vitamin B6 (pyridoxine), vitamin B7 (biotin), vitamin B9 (folic acid), vitamin B12 (cobalamin), vitamin C (ascorbic acid), vitamin D, vitamin E, vitamin K, trace mineral iron, trace mineral zinc, trace mineral iodine, trace mineral copper, trace mineral manganese, trace mineral fluoride, trace mineral chromium, trace mineral selenium, trace mineral molybdenum, and trace mineral boron, and a combination thereof. Here, the phrase "combination thereof" means two or more of these nutrients. The active ingredient may include additional nutrients not listed above.

Further, the coating material may be one of a biopolymer including saponin rich fraction obtained from fenugreek seeds, a polyethylene glycol (PEG) identified with Registry Number 25322-68-3 in the Chemical Abstract Service of the American Chemical Society, chitosan, and a combination thereof. The phrase "combination thereof" means PEG and biopolymer, or PEG and chitosan, or biopolymer and chitosan, or PEG, biopolymer and chitosan.

The formulation may further include unpleasant smell or taste reducing agent and/or heat shielding agent, such as, cyclodextrin-a and cyclodextrin-c for countering (masking)

fowl, unpleasant smell or taste of active ingredient. The cyclodextrin-a and cyclodextrin-c also provide heat shield to the actives in while preparing gummies which includes inner portion having the CBD formulation, and an outer portion formed of edible material and may optionally include one or more of additional active ingredients, such as vitamin C.

In another aspect of the present invention, the coating material is not used. In other words, the liposomal vesicles of the dispersion containing CBD and other active ingredients (which are optional) are not surrounded by the coating material. In this case, the CBD formulation having liposomal vesicles without being surrounded by the coating material is incorporated within the inner portion of the gummy.

The methods of making various formulations including active ingredients are discussed in the U.S. application Ser. Nos. 16/522,021, 15/475,636, 15/414,877, and 14/132,486, which incorporated hereinby reference.

A method of making a gummy containing CBD formulation discussed above according to the present invention generally includes the method steps of setting up a central filling apparatus having a shell syrup hopper, a central filling hopper, a shell syrup strike piston disposed shell syrup hopper, a central filling strike piston disposed in the central filling hoper; and a manifold branch and nozzle mechanism connected with each of the shell syrup strike piston and the central filling strike piston, and a gummy mold; filling the shell syrup hopper with a base material and/or maintaining/heating the base material at/to a first temperature of 80° C.; filling the central filling hopper with the CBD formulation and maintaining/heating the CBD formulation at a second temperature of 30° C.; dispensing the base material in the manifold branch and nozzle mechanism by using the shell syrup strike piston; dispensing the CBD formulation in the manifold branch and nozzle mechanism by using the central filling strike piston; further dispensing said base material and said formulation in the gummy mold such that the formulation is surrounded by the base material thereby forming a gummy in the gummy mold; decoupling the gummy mold; cooling of the gummy mold; and extracting the gummy from the gummy mold.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
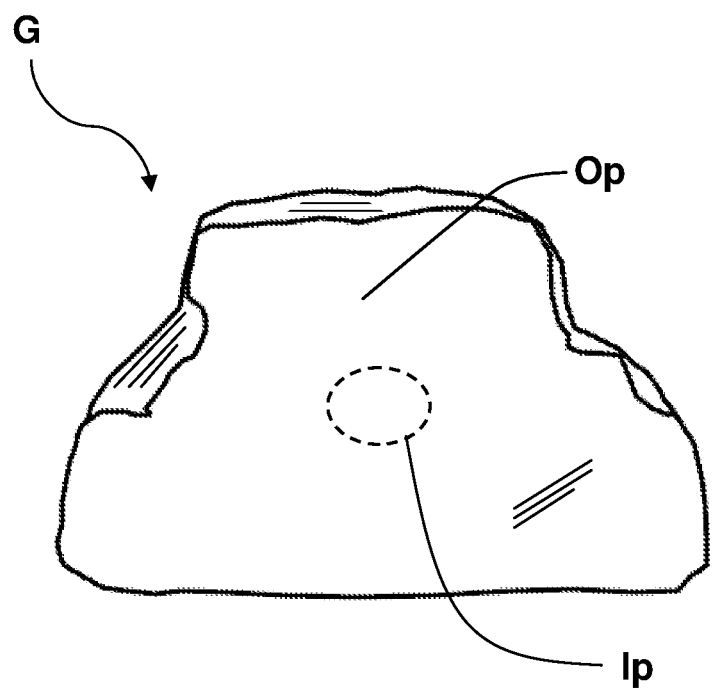
FIG. 1 is a view of a gummy according to the present invention.

Gummies are chewable pieces, mostly made of sweet material. The gummies have a base material including gelatin or pectin. The present invention provides gummies containing a CBD formulation, which may be in a liquid or gel form. The formulation includes nutrients/active ingredients, such as, cannabinoids/cannabidiol (hereinafter referred to as Hemp CBD, hemp-derived CBD or as CBD) and/or tetrahydrocannabinol (THC), or a combination thereof incorporated in a distinctive matrix.

The active ingredients, such as, cannabinoids/cannabidiol (hereinafter referred to as Hemp CBD, hemp-derived CBD or simply as CBD) and/or tetrahydrocannabinol (THC), or a combination thereof are referred to as CBD hereinafter. The formulations used in the present invention include CBD, and are referred to as CBD formulations. It may be noted that CBD is a chemical compound which is a natural compound found in plants of the *cannabis* genus, e.g., *Cannabis sativa* plant.

While CBD is an essential component of medical marijuana, it is derived directly from the hemp plant, which is a cousin of the marijuana plant. While CBD is a component of marijuana (one of hundreds), by itself it does not cause a "high." According to a report from the World Health Organization, "In humans, CBD exhibits no effects indicative of any abuse or dependence potential. . . . To date, there is no evidence of public health related problems associated with the use of pure CBD." (World Health Organizations, Canabidiol (CBD) Critical Review Report, June 2018).

Further, the active ingredients may additionally include one of reduced glutathione, vitamin A, vitamin $B_1$ (thiamine), vitamin $B_2$ (riboflavin), vitamin $B_3$ (niacin), vitamin $B_5$ (pantothenic acid), vitamin $B_6$ (pyridoxine), vitamin $B_7$ (biotin), vitamin $B_9$ (folic acid), vitamin $B_{12}$ (cobalamin), vitamin C (ascorbic acid), vitamin D, vitamin E, vitamin K, trace mineral iron, trace mineral zinc, trace mineral iodine, trace mineral copper, trace mineral manganese, trace mineral fluoride, trace mineral chromium, trace mineral selenium, trace mineral molybdenum, and trace mineral boron, and a combination thereof.

The distinctive matrix of active ingredients, e.g., CBD incorporated in liposomal vesicles facilitates efficient oral intake and absorption of powerful nutrients including antioxidants into a human body or an animal body for an extended time period. The active ingredients such as CBD is incorporated, i.e., enclosed in liposomal vesicles of phospholipids. The liposomal vesicles may be covered by providing a free flowing barrier coating a polymer including one of PEG, a biopolymer (derived from fenugreek seeds), chitosan, and a combination thereof. The polymer provides a physical barrier coating to the liposomal vesicles.

In other words, the polymer acts as a liner to liposomal vesicles. However, polymer is not attached to the liposomal vesicles. The liposomal vesicles may be of various sizes and shapes. Generally, the liposomal vesicles are about 40-400 µm in diameter. Various flavors, such as oil phase flavors and aqueous phase flavor, may be added to the formulations. Generally, the formulations may include one or more of oil phase flavor such as a citrus flavor, and aqueous phase flavor such as a pineapple flavor and a watermelon flavor. The CBD formulation may also include polysaccharide, such as gum arabic, and glycerin.

Structure of Gummy

As shown in FIG. 1, a gummy according the present invention includes an inner portion Ip, and an outer portion Op which surrounds the inner portion Ip. The outer portion Op includes the base material. e.g., pectin. Pectin is preferred by vegetarians—people whose diets mainly contain various levels of fruits, vegetables, grains, pulses, nuts and seeds—since it does not include any material derived from animals. Pectin is derived from fruits such as apples, pears, guavas, quince, plums, gooseberries and oranges. The shape of the gummy shown in FIG. 1 is for illustration purpose only. The gummy may have different shapes.

More specifically, according to the present invention, the gummy G includes the inner portion Ip, the CBD formulation having a dispersion including a plurality of liposomal vesicles contained in the inner portion Ip; and the outer portion Op which surrounds the inner portion Ip containing the CBD formulation.

The CBD formulation is arranged/disposed in the inner portion Ip by using a method of making gummy discussed herein. As discussed above, the formulation includes at least an active ingredient, i.e., cannabidiol (CBD); phospholipid contained in the liposomal vesicles; and an optional coating material, e.g., a combination of polyethylene glycol and chitosan; wherein the CBD is incorporated within the liposomal vesicles, and the coating material (if used) is free flowing in the dispersion such that the liposomal vesicles are surrounded by the coating material without being attached to the liposomal vesicles and without forming part of the liposomal vesicles and without affecting weight of the liposomal vesicles. The phospholipid may include sunflower lecithin. The dispersion of the formulation may be filtered using a tangential flow technique, which washes out outer periphery of the liposomal vesicles so as to remove inactive ingredients contained outside the liposomal vesicles without washing out the coating material surrounding the liposomal vesicles. The formulation of present invention which includes CBD is also referred to as CBD formulation.

The inner portion generally has a volume of 1-5 ml. However, more preferably, the inner portion has a volume of about 1 milliliter which accommodates up to 10 mg of the active ingredient in the CBD formulation. The CBD used in the present invention is a natural compound found in plants of *cannabis* genus.

The volume of the inner portion Ip may be increased or decreased depending on active ingredients. Depending on the size of the gummy, the inner portion may have volume of less than 1 ml, or more than 1 ml, may up to 5 ml. Thus, the inner portion may accommodate up to 50 mg of CBD. However, the preferable size is up to 1 ml which accommodates up to 10 mg of CBD.

The outer portion Op may be made of any edible material including hydrocolloids. A nutrient pre-mix, e.g., vitamin pre-mix can be added into the outer portion Op. Thus, the outer portion Op may include one or more active ingredients.

It may be noted that by doing a core based product filling, i.e., creating inner portion that contains/filled with the CBD formulation, less material is lost so that 7-12% overage on the CBD formulation can be achieved.

The CBD formulation may include other active ingredients, such as vitamin C (ascorbic acid). When vitamin C is used in the formulation, an illustrative composition of the formulation includes the CBD in the amount of about 10 mg, and vitamin C in the amount of about 150 mg.

A composition of the CBD formulation/dispersion may include 58 mg of CBD; sunflower lecithin in the amount of about 125 mg, said sunflower lecithin being the phospholipid; medium-chain triglycerides (MCT oil) in the amount of 116 mg; sodium benzoate in the amount of 2 mg; potassium sorbate in the amount of 2 mg; citric acid in the amount of about 2 mg; gum arabic in the amount of about 1597 mg; *stevia* in the amount of about 105 mg; orange flavor in the amount of about 140 mg and pineapple flavor. Further, the CBD formulation contained in the inner portion Ip of the gummy G includes cyclodextrin-a and cyclodextrin-c.

Apparatus for Making Gummies

Figure 2:
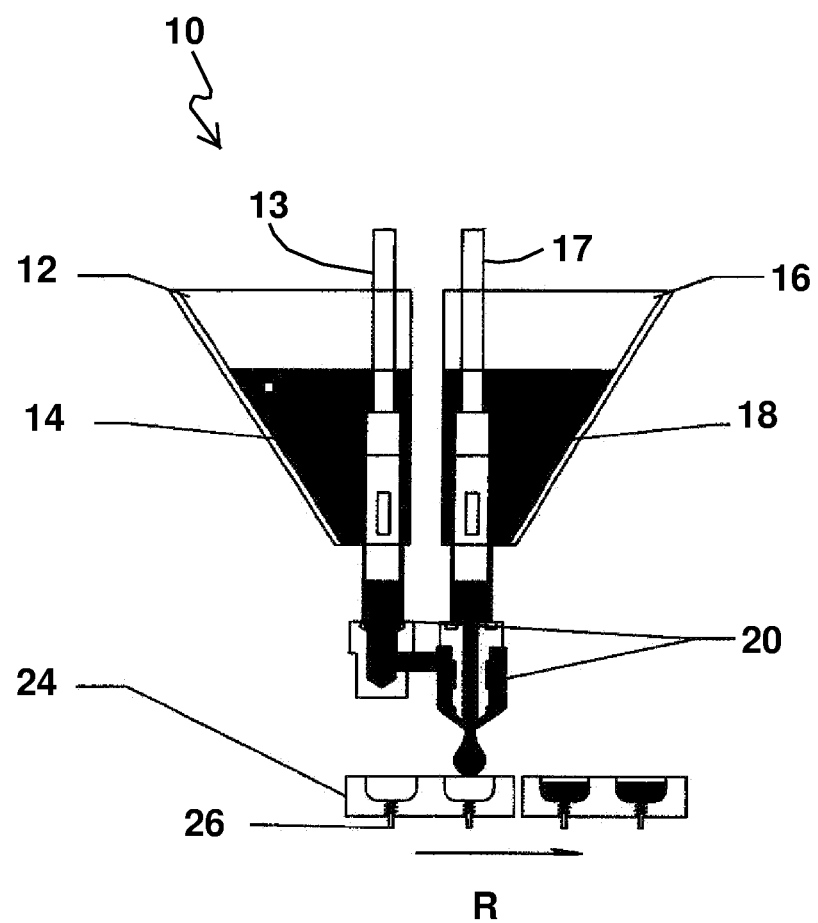
FIG. 2 is a schematic view of a central filling apparatus used for making gummies.

A central filling apparatus 10, shown in FIG. 2, is used for making gummies of the present invention. The central filling apparatus 10 includes a shell syrup hopper 12 for receiving and dispensing shell syrup (base material) 14 and a central filling hopper 16 for receiving and dispensing central filling material (i.e., CBD formulation) 18. A shell syrup strike piston 13 disposed in the shell syrup hopper 12. A central filling material piston 17 disposed in the central filling hopper 16. A manifold branch and nozzle mechanism 20 is used for dispensing shell syrup/base material and the CBD formulation. A candy mold/gummy mold 24 is arranged at a position below lower portions of the shell syrup hopper 12 and the central filling hopper 16. A de-moulding pin 26 is used for demoulding the gummies. The gummy mold 24 is aluminum teflon coated. The shell syrup strike piston 13 is configured to dispense shell syrup 14. The central filling material piston 17 is configured to dispense central filing material 18.

The shell syrup (i.e., gummies base material such as pectin derived from fruits) 14 is placed in/supplied to the shell syrup hopper 12. The shell syrup 14 in the shell syrup hopper 12 is at a first temperature, which is about 80° C./176° F. The central filling material (e.g., CBD formulation) 18 is placed in/supplied to central filling hopper 16, and heated to/maintained at a second temperature, which is about 30° C.

The two shell syrup and central filling hoppers 12, 16 work independently of each other. But both masses (base material and CBD formulation) 14, 18 end up running through one universal nozzle which has multiple pipe lines.

The cyclodextrin-a and cyclodextrin-c included in the CBD formulation act as a heat shield which in turn helps prevent the heat from damaging the active ingredients in the formulation during the process of making gummies. The cyclodextrin-a and cyclodextrin-c can be replaced with the other heat shielding agents.

The shell syrup material flowing through the shell syrup hopper 12 deposits shell syrup material 14 in the strike piston 13 but at a separate temperature (i.e., the first temperature of about 80° C.) than the temperature (i.e., the second temperature of about 30° C.) of the filling material/CBD formulation 18 in the central filling hopper 16. Generally, within 4 minutes of dispending the CBD formulation in the mold 24, the CBD formulation 18 is cooled down to a room temperature as there is an automatic cooling system that the mold runs through. The mold 24 moves in the direction shown by R. Then the material is deposited on a tray and left to cure for about 48 hours.

In other words, the manifold branch and nozzle mechanism 20 and in combination with strike pistons 13, 17 deposits shell syrup 14 and filling material/CBD formulation 18 in the mould 24 such that the temperature of shell syrup 14 is higher than the temperature of the filling material/CBD formulation 18.

As shown in FIG. 1, the gummies G made in this manner include the inner portion Ip, and the outer portion Op which surrounds the inner portion. The inner portion Ip includes the CBD formulation having a dispersion including a plurality of liposomal vesicles.

Before placing the CBD formulation in the central filling apparatus, the CBD formulation dispersion may be filtered using a tangential flow technique which washes out outer periphery of liposomal vesicles so as to remove said inactive ingredient contained outside the liposomal vesicles. However, it may be noted that, tangential flow does not take out coating material which is free flowing in the dispersion such that the liposomal vesicles remain surrounded by the coating material without being attached to the liposomal vesicles and without forming part of the liposomal vesicles and without affecting weight of liposomal vesicles. The outer portion Op is formed of an edible material such pectin, and may include active ingredients.

Method of Making Gummies

Figure 3:
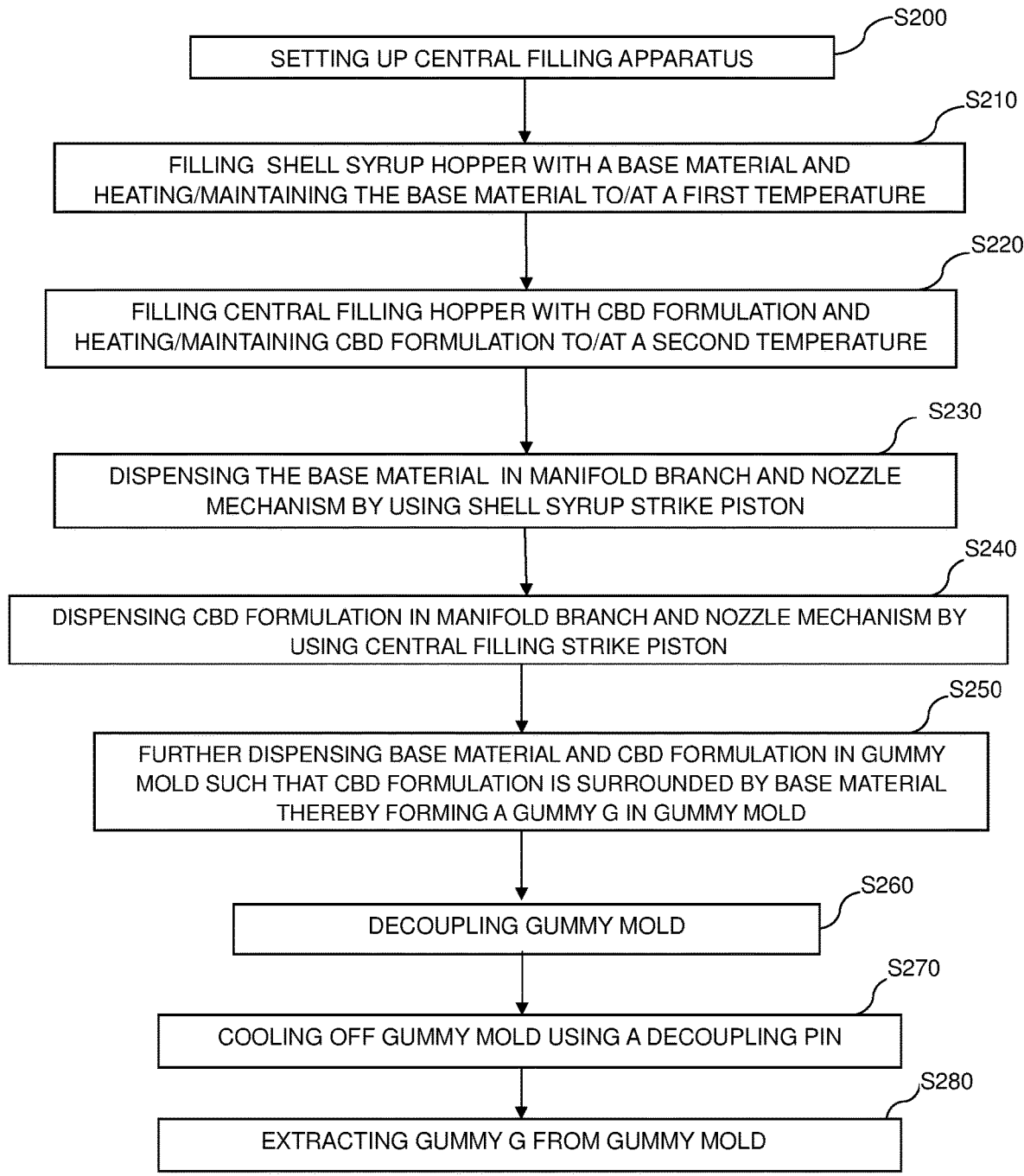
FIG. 3 is a flowchart showing method steps of making gummies.

The method of making a gummy containing the CBD formulation is illustrated in FIG. 3.

The method of making the gummy includes the method steps of setting up the central filling apparatus 10 (STEP S200), the central filling apparatus 10 having the shell syrup hopper 14, the central filling hopper 16, the shell syrup strike piston 13 disposed shell syrup hopper 14, a central filling strike piston 17 disposed in the central filling hoper 16; and the manifold branch and nozzle mechanism 20 connected with each of the shell syrup strike piston 13 and the central filling strike 17 piston, and the gummy mold 26; filling the shell syrup hopper 14 with a base material (e.g., pectin) and maintaining and/or heating the base material at a first temperature (of about 80° C.) (STEP S210); filling the central filling hopper 16 with the CBD formulation and maintaining and/or heating the formulation to a second temperature (of about 30° C.) (STEP S220); dispensing the base material in the manifold branch and nozzle mechanism 20 by using the shell syrup strike piston 13 (STEP S230); dispensing the CBD formulation in the manifold branch and nozzle mechanism 20 by using the central filling strike piston 17 (STEP S240); further dispensing the base material and the CBD formulation in the gummy mold 24 such that the formulation is surrounded by the base material thereby forming a gummy G in the gummy mold 24 (STEP S250); decoupling the gummy mold 24 (STEP S260); cooling off the gummy mold using the decoupling pin 26 (STEP S270); and extracting the gummy G from the gummy mold 24 (STEP S280).

In the method of making the gummy the first temperature is always greater than the second temperature; and the first temperature is about 80° C. and the second temperature is about 30° C. As discussed above, the CBD formulation includes cyclodextrin-a and cyclodextrin-c, which provide heat shield to the formulation from pectin (outer portion Op of the gummies G) since it compartmentalize the gummy G. The cyclodextrin-a and cyclodextrin-c may be replaced with other heat shielding agents.

The above discussed method provides the gummy in which the inner portion Ip has a volume of 1-5 ml; and when the inner portion Ip has a volume of about 1 milliliter, the inner portion Ip accommodates up to 10 mg of active CBD in the CBD formulation.

The present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A gummy comprising
an inner portion;
a formulation having a dispersion including a plurality of liposomal vesicles contained in the inner portion; and
an outer portion which surrounds the inner portion;
wherein said formulation comprises
an active ingredient comprising one or more nutrients including cannabidiol (CBD);
phospholipid contained in said liposomal vesicles; and
a coating material comprising a combination of polyethylene glycol and chitosan;
wherein said active ingredient including said CBD is incorporated within said liposomal vesicles;
wherein the coating material is free flowing in said dispersion such that said liposomal vesicles are surrounded by said coating material without being attached to said liposomal vesicles and without forming part of said liposomal vesicles and without affecting weight of the liposomal vesicles; and
wherein said dispersion is filtered using a tangential flow technique, which washes out outer periphery of the liposomal vesicles so as to remove inactive ingredients contained outside the liposomal vesicles without washing out the coating material surrounding the liposomal vesicles.

2. The gummy according to claim 1, wherein said inner portion has a volume of 1-5 ml.

3. The gummy according to claim 1, wherein the inner portion has a volume of about 1 milliliter which accommodates up to 10 mg of said CBD active ingredient.

4. A gummy according claim 1, wherein CBD is a natural compound found in plants of cannabis genus.

5. The gummy according claim 1, wherein said active ingredients further comprises vitamins and minerals including Vitamin C (ascorbic acid) and curcumin.

6. The gummy according claim 5, wherein said CBD is in the amount of about 10 mg and vitamin C is in the amount of about 150 mg.

7. The gummy according to claim 1, wherein said phospholipid is sunflower lecithin; and wherein a composition of said formulation includes the CBD in the amount of about 58 mg; the sunflower lecithin in the amount of about 125 mg; medium chain triglycerides in the amount of 116 mg; sodium benzoate in the amount of 2 mg; potassium sorbate in the amount of 2 mg; citric acid in the amount of about 2 mg; gum arabic in the amount of about 1597 mg; stevia in the amount of about 105 mg; orange flavor in the amount of about 140 mg and pineapple flavor.

8. The gummy according to claim 1, wherein said formulation further comprises cyclodextrin-a and cyclodextrin-c.

9. The gummy according claim 1, wherein said phospholipid comprises sunflower lecithin.

10. A method of making a gummy containing a formulation, said gummy having an inner portion; the formulation having a dispersion including a plurality of liposomal vesicles contained in the inner portion; and an outer portion which surrounds the inner portion; said formulation comprising an active ingredient including cannabidiol (CBD); phospholipid contained in said liposomal vesicles; and a coating material comprising a combination of polyethylene glycol and chitosan; said CBD being incorporated within said liposomal vesicles;
the coating material being free flowing in said dispersion such that said liposomal vesicles containing the CBD are surrounded by said coating material without being attached to said liposomal vesicles and without forming part of said liposomal vesicles and without affecting weight of the liposomal vesicles;

said method of making the gummy comprising the steps of setting up a central filling apparatus having a shell syrup hopper, a central filling hopper, a shell syrup strike piston disposed shell syrup hopper, a central filling strike piston disposed in the central filling hoper; and a manifold branch and nozzle mechanism connected with each of the shell syrup strike piston and the central filling strike piston, and a gummy mold;

filling the shell syrup hopper with a base material and maintaining said base material at a first temperature;

filling the central filling hopper with said formulation and maintaining said formulation at a second temperature;

dispensing said base material in the manifold branch and nozzle mechanism by using the shell syrup strike piston;

dispensing said formulation in the manifold branch and nozzle mechanism by using the central filling strike piston;

further dispensing said base material and said formulation in the gummy mold such that the formulation is surrounded by the base material thereby forming a gummy in the gummy mold;

decoupling the gummy mold;

cooling of the gummy mold; and extracting the gummy from the gummy mold.

11. The method of making a gummy according to claim 10, wherein said first temperature is greater than the second temperature.

12. The method of making a gummy according to claim 10, wherein said first temperature is about 80° C. and the second temperature is about 30° C.

13. The method of making a gummy according to claim 10, wherein said formulation further comprises cyclodextrin-a and cyclodextrin-c.

14. The method of making a gummy according to claim 10, wherein said inner portion has a volume of 1-5 ml.

15. The method of making a gummy according to claim 10, wherein the inner portion has a volume of about 1 milliliter which accommodates up to 10 mg of said CBD formulation.

16. The method of making a gummy according to claim 10, wherein CBD is a compound found in plants of cannabis genus.

17. The method of making a gummy according to claim 10, wherein said phospholipid comprises sunflower lecithin.

18. The method of making a gummy according to claim 10, wherein said base material is pectin derived from one or more fruits.

19. The method of making a gummy according to claim 10, wherein said base material is an edible material including hydrocolloids comprising one or more vitamins and minerals.

20. The method of making a gummy according to claim 10, wherein said gummy mold is teflon coated.

* * * * *